United States Patent [19]

Campion

[11] Patent Number: 4,486,146
[45] Date of Patent: Dec. 4, 1984

[54] AIRCRAFT PROPULSION MEANS
[75] Inventor: Brian S. Campion, Weybridge, England
[73] Assignee: British Aerospace Public Limited Company, London, England
[21] Appl. No.: 289,734
[22] Filed: Aug. 3, 1981
[30] Foreign Application Priority Data Aug. 8, 1980 [GB] United Kingdom ............... 8025954

[51] Int. Cl.³ .............................................. B64C 11/48
[52] U.S. Cl. .................................. 416/129; 415/148; 415/150; 416/127
[58] Field of Search ............... 415/148, 150, 210, 129, 415/130, 216; 416/127, 128, 129, 120, 126, 124, 128 R

[56] References Cited

U.S. PATENT DOCUMENTS

| | | | |
|---|---|---|---|
| 1,853,694 | 4/1932 | Melcher | 416/129 |
| 2,312,624 | 3/1943 | Caldwell | 416/125 |
| 2,504,559 | 4/1950 | Martin et al. | 416/129 |
| 3,081,964 | 3/1963 | Quenzler | 244/7 R |
| 3,811,791 | 5/1974 | Cotton | 416/129 |

FOREIGN PATENT DOCUMENTS 617290 2/1949 United Kingdom ............... 416/129

Primary Examiner—Henry C. Yuen
Assistant Examiner—John Kwon
Attorney, Agent, or Firm—Cushman, Darby & Cushman

[57] ABSTRACT

An aircraft propulsion means 20 comprises a multi-bladed, unshrouded, propeller fan 27 adapted in a cruise condition to operate at such high disc loadings that a substantial component of swirl is imparted to the slipstream in a given sense, and swirl reducing means (for example a multi-bladed stator 35) arranged with respect to the propeller fan to impart a considerable component of swirl in the opposite sense, whereby the total swirl imparted to the slipstream is nil or relatively low.

9 Claims, 14 Drawing Figures

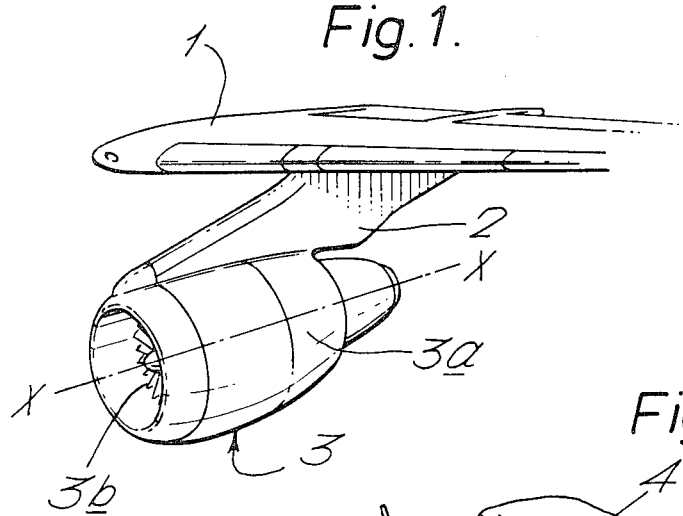
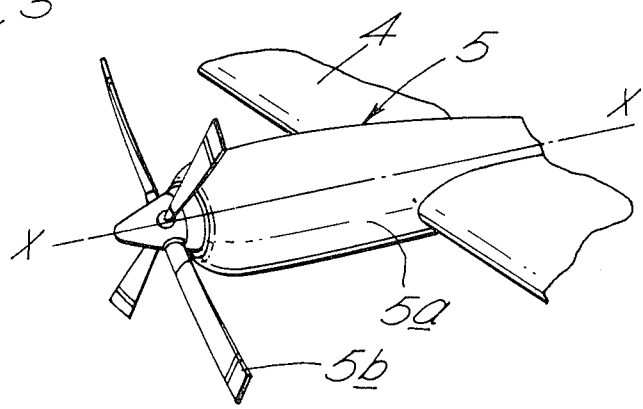
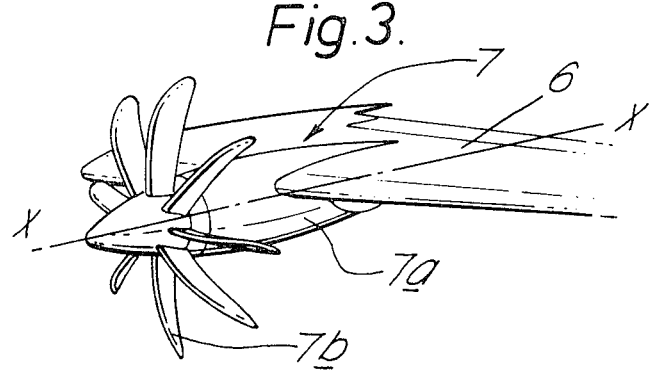

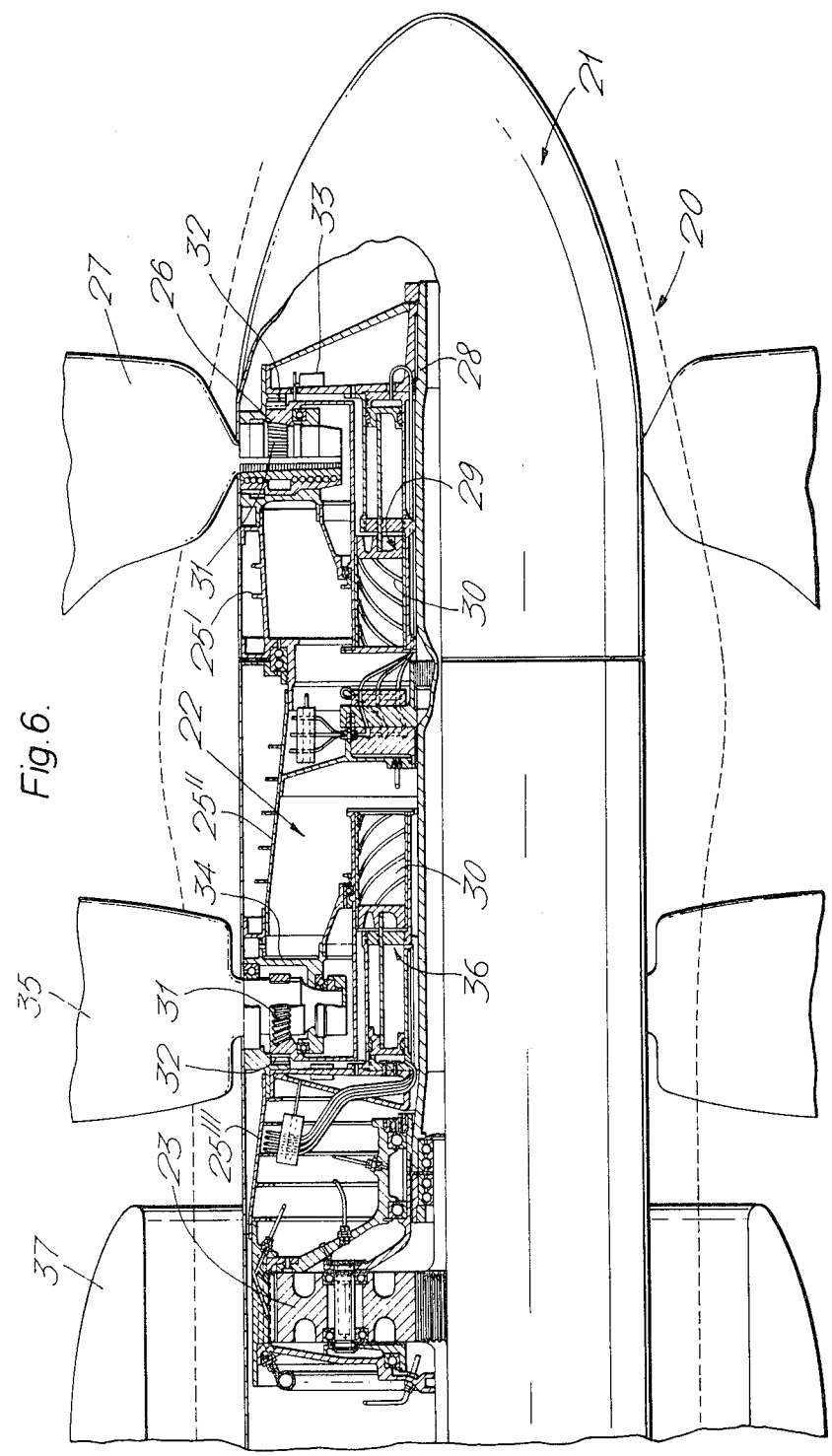

35

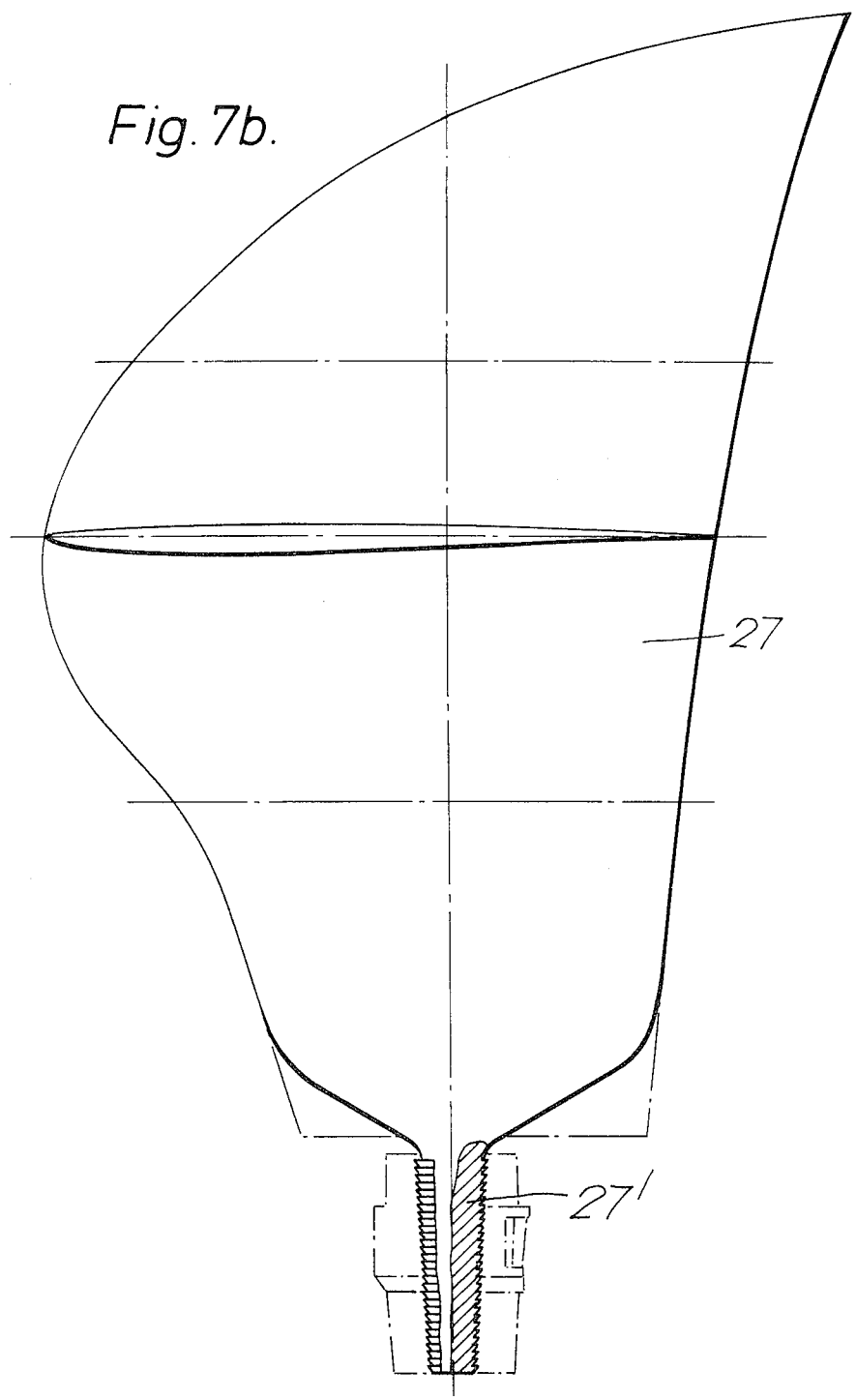

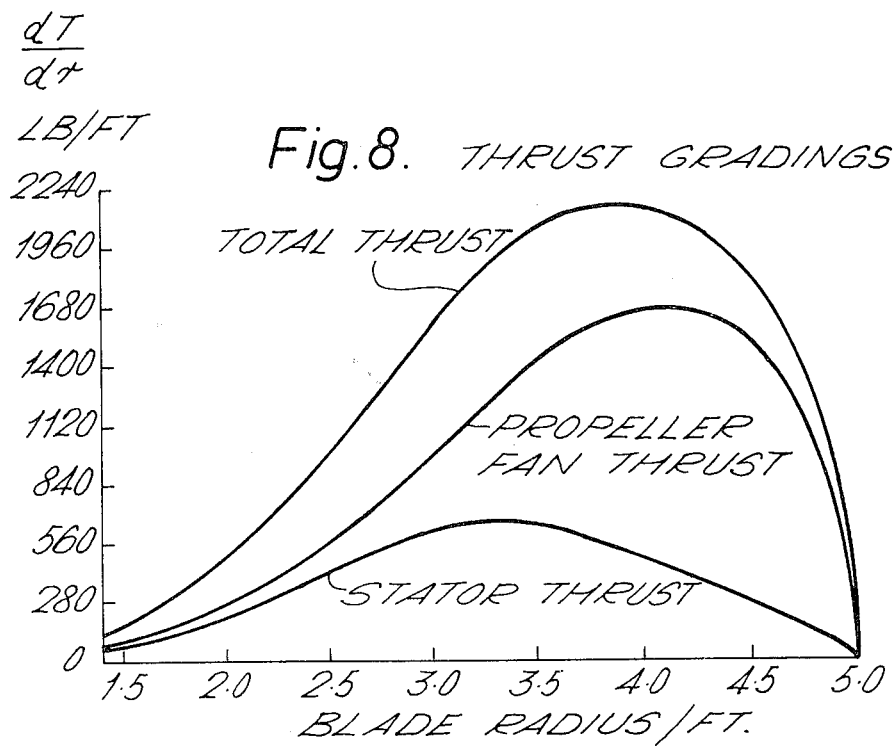
Fig. 8. THRUST GRADINGS
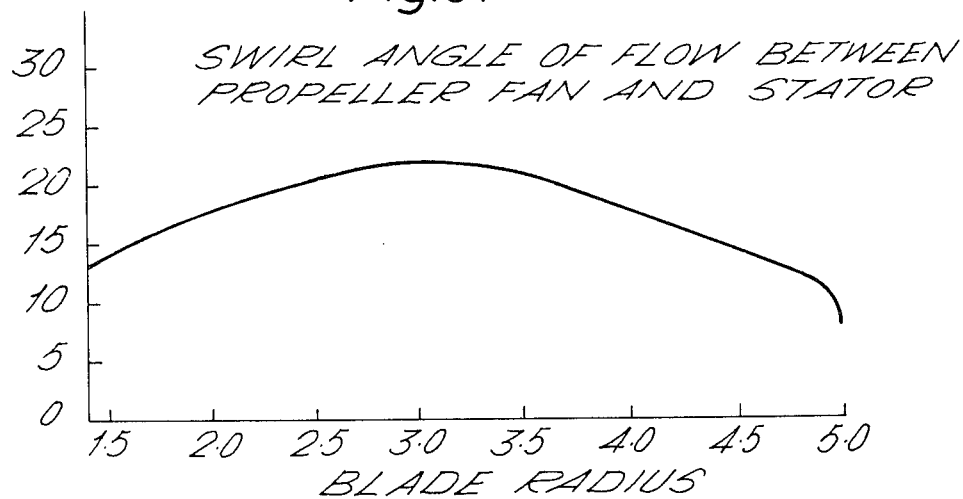
Fig. 9.

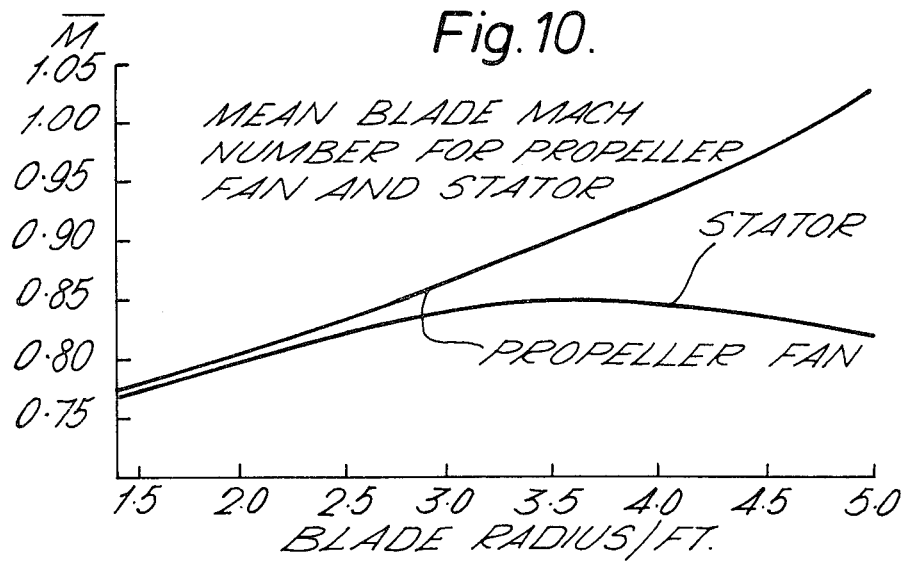
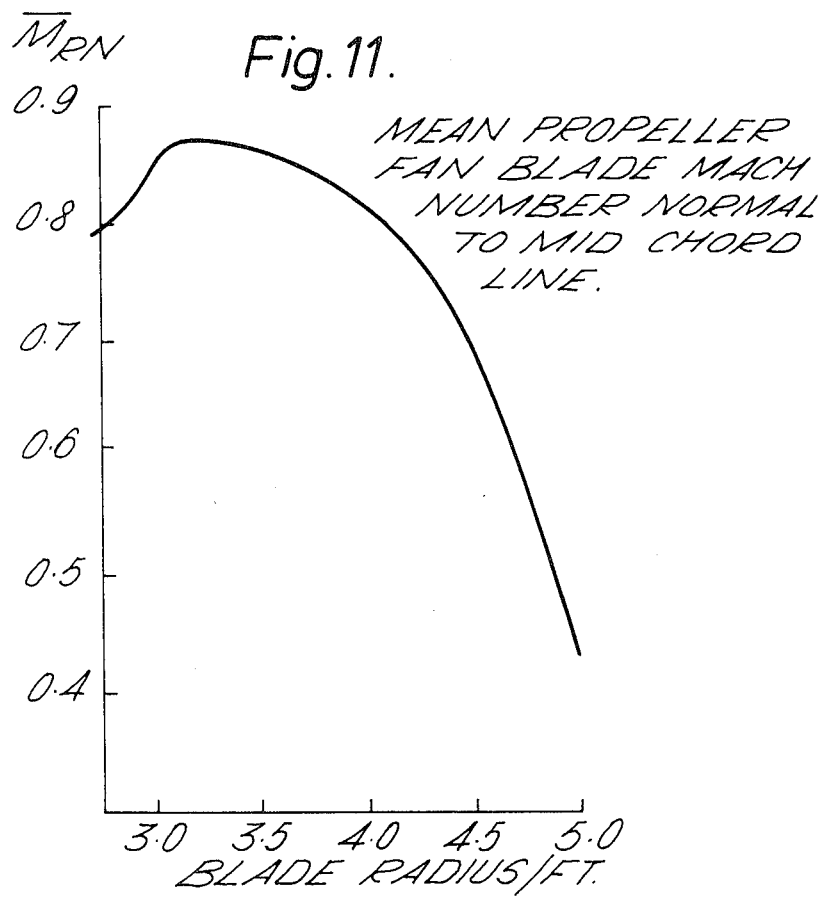

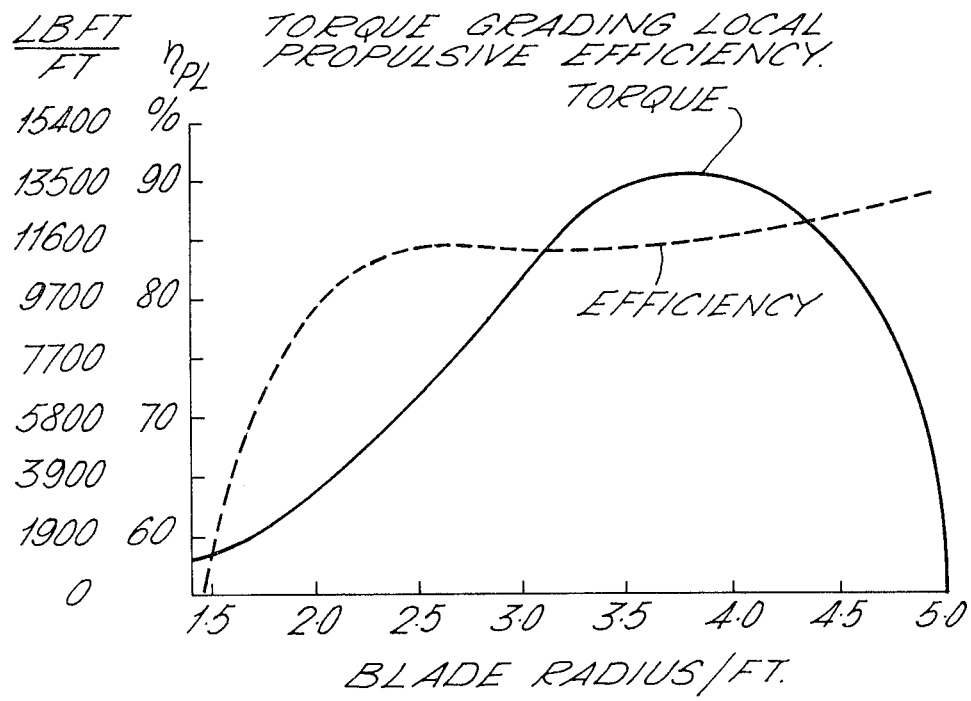

AIRCRAFT PROPULSION MEANS

This invention relates to aircraft propulsion means of the type which include at least one multi-bladed, unshrouded, rotor.

Hitherto, such propulsion means have included rotors having a relatively small number of blades sweeping a relatively large disc area, that is to say propellers, or rotors having a relatively large number of blades sweeping a relatively small disc area, that is to say fans or turbofans. More recently, there has been envisaged a compromise arrangement in which the rotor has an intermediate number of blades sweeping a disc of intermediate area, that is to say a hybrid propeller fan.

As aircraft size and/or cruising speeds increase, such propulsion means are required to deliver high thrust and where this is necessary without a corresponding increase in the disc area swept, disc loading (that is to say, thrust per unit disc area) naturally increases. It is found, however, that as this disc loading increases a relative deterioration in propulsive efficiency occurs. This is partly attributable to an increased swirl imparted to the efflux or slip stream.

According to one aspect of the present invention, there is provided an aircraft propulsion means including a multi-bladed, unshrouded, propeller fan adapted in use to operate at such high disc loadings that a substantial component of swirl is imparted to the slipstream in a given sense, and swirl reducing means arranged with respect to the propeller fan to impart a considerable component of swirl in the opposite sense, whereby the total swirl imparted to the slipstream is nil or relatively low. By this arrangement, the propulsive efficiency of the propulsion means can be high.

The swirl-reducing means preferably comprises a multi-bladed stator and in this case, may be located at least partially within the slipstream of said propeller fan.

The propeller fan preferably includes from 10 to 15 blades. The stator preferably includes from 10 to 15 blades.

The propulsion means is preferably designed having regard to the thrust required and the diameter of propeller fan so that the swirl angle generated by the propeller fan lies in the range of from 10° to 25°.

Advantageously, the pitch of the blades of the propeller fan and the stator (where provided) may be varied. Preferably, the solidity of the propeller fan—that is to say the ratio of the total blade area to the area swept by the blades-lies in the range of from 0.8 to 1.5.

Preferably, the propeller fan operates at a cruise condition with disc loading—that is to say the thrust developed by the propeller fan alone divided by the propeller fan disc area—of from 30 to 60 lb/ft$^2$.

It is found that wings having a high subsonic design Mach number are susceptible to disturbances in the air-flow over them. Such disturbances are present when propulsion means including large diameter propellers or propeller fans are carried on such wings; because of ground clearance problems, the slipstream therefrom may envelope a large region of the wing.

According to a further aspect of this invention, there is provided an aircraft wing having propulsion means mounted generally below it, said propulsion means including a multi-bladed, unshrouded propeller fan of relatively small disc area and adapted in use to generate a relatively large thrust and thus to operate at such high disc loadings that a substantial component of swirl in a given sense is imparted to the slipstream, and a multi-bladed stator arranged at least partially within the slipstream of the propeller fan and adapted to impart a considerable component of swirl in the opposite sense so that the total swirl imparted to the slipstream is nil or relatively low in the cruise condition, the diameter of the propeller fan and the stator being such that substantially all the slipstream passes below the wing, whilst maintaining sufficient ground clearance to allow take-off and landing manoeuvres.

One embodiment of the invention is described by way of example with reference to the accompanying drawings in which:

FIG. 1 is a sketch of an aircraft turbo fan installation for comparison purposes, FIG. 2 is a sketch of a propeller installation for comparison purposes, FIG. 3 is a sketch of a hybrid propeller fan installation also for comparison purposes, FIG. 4 is a sketch of an installation for a propulsion means of the present invention, FIG. 5 is a diagrammatic comparison of the swept disc areas associated with the installations of FIGS. 1 to 4;

FIG. 6 is a part-sectioned side view of a propulsion means of the present invention;

FIGS. 8 to 12 show various characteristics of a typical propulsion means of the present invention, in each case plotted against blade radius:

FIG. 8 shows thrust gradings for the propeller fan and stator blades;

FIG. 9 shows swirl angles for the flow between the propeller fan and stator blades;

FIG. 10 shows mean blade Mach numbers for the propeller fan and stator blades;

FIG. 11 shows mean propeller fan blade Mach numbers normal to mid chord line;

FIG. 12 shows torque grading and local propulsive efficiency for the propeller fan blades.

Figure 4:
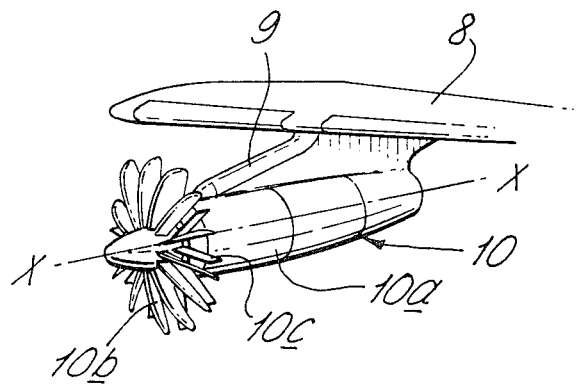

The Figures are not necessarily to the same scale.

In FIG. 1, an aircraft wing 1 has a depending pylon 2 on which a turbofan powerplant 3 is carried. In essence the powerplant 3 comprises a gas generator 3a which drives a shrouded multi-bladed fan 3b rotating about an axis X—X.

In FIG. 2, an aircraft wing 4 carries a turboprop powerplant 5 which essentially comprises a gas generator 5a driving a four-bladed propeller 5b rotating about an axis X—X.

In FIG. 3, an aircraft wing 6 carries a hybrid powerplant 7 which comprises a gas generator 7a driving a hybrid propeller fan 7b being best described as having some features of a propeller and some features of a fan. It again rotates about an axis X—X. The propeller fan 7b is unshrouded.

In FIG. 4, an aircraft wing 8 has a depending pylon 9 on which a powerplant 10 having features according to the invention is carried. This powerplant incorporates a gas generator 10a which drives, about an axis X—X, an unshrouded multi-bladed propeller fan 10b. Behind the propeller and generally within its slipstream of efflux is carried an unshrouded multi-bladed stator 10c. The blades of the stator 10c are aerofoil shaped in cross-section and are designed to at least reduce the swirl inherent in the slipstream of the propeller fan 10b and thus to generate a forward thrust. In other words, in generating this forward thrust, the swirl is at least partly removed.

In the arrangement illustrated, the stator 10c lies behind the propeller fan 10b. In some instances, the stator may well lie in front of the propeller fan.

Figure 5:
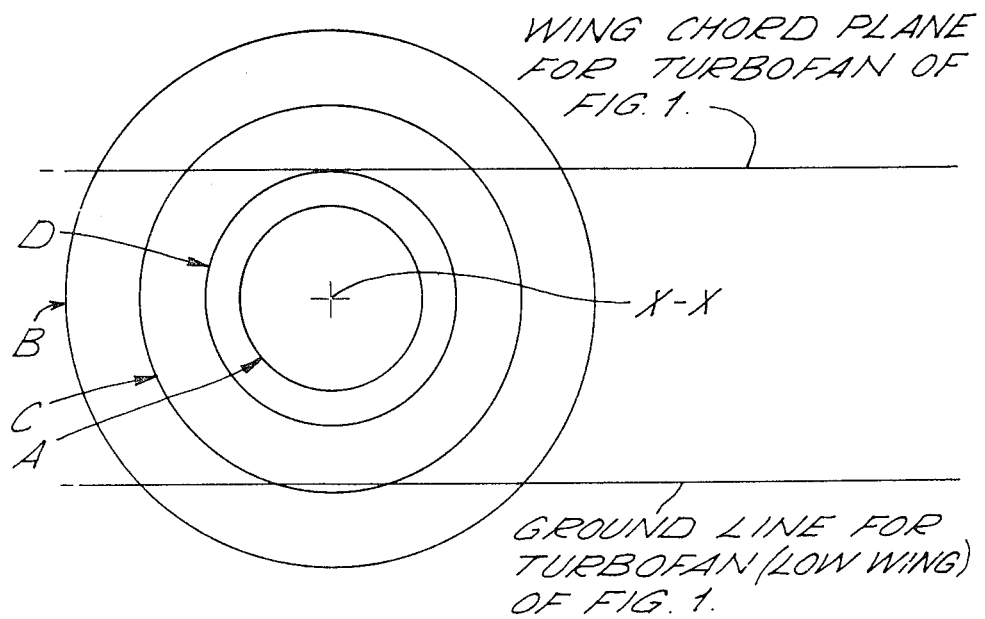

Referring now to FIG. 5, the areas of the discs swept by the blades of the embodiments of FIGS. 2, 3 and 4 are illustrated to scale, for comparison with that area within the periphery of the shroud of the turbofan powerplant of FIG. 1. For comparison, approximately equivalent thrust generation is assumed in all cases. The axes of rotation X—X are shown coincident with one another. The shroud periphery of the embodiment of FIG. 1 is shown at A, the swept disc of the embodiment of FIG. 2 is shown at B, the swept disc of the embodiment of FIG. 3 is shown at C, whilst the swept disc of the embodiment of FIG. 4 is shown at D. As can be seen, although the disc D is of greater diameter than that of the turbofan shroud of FIG. 1, it is appreciably smaller than those of the hybrid arrangement of FIG. 3 and the propeller of FIG. 2. Its size clearly aids incorporation in an airframe since adequate ground clearance can be provided without an excessively lengthy undercarriage. Moreover, a wing can be kept clear of slipstream to operate in relatively undisturbed airflow.

Figure 7A:
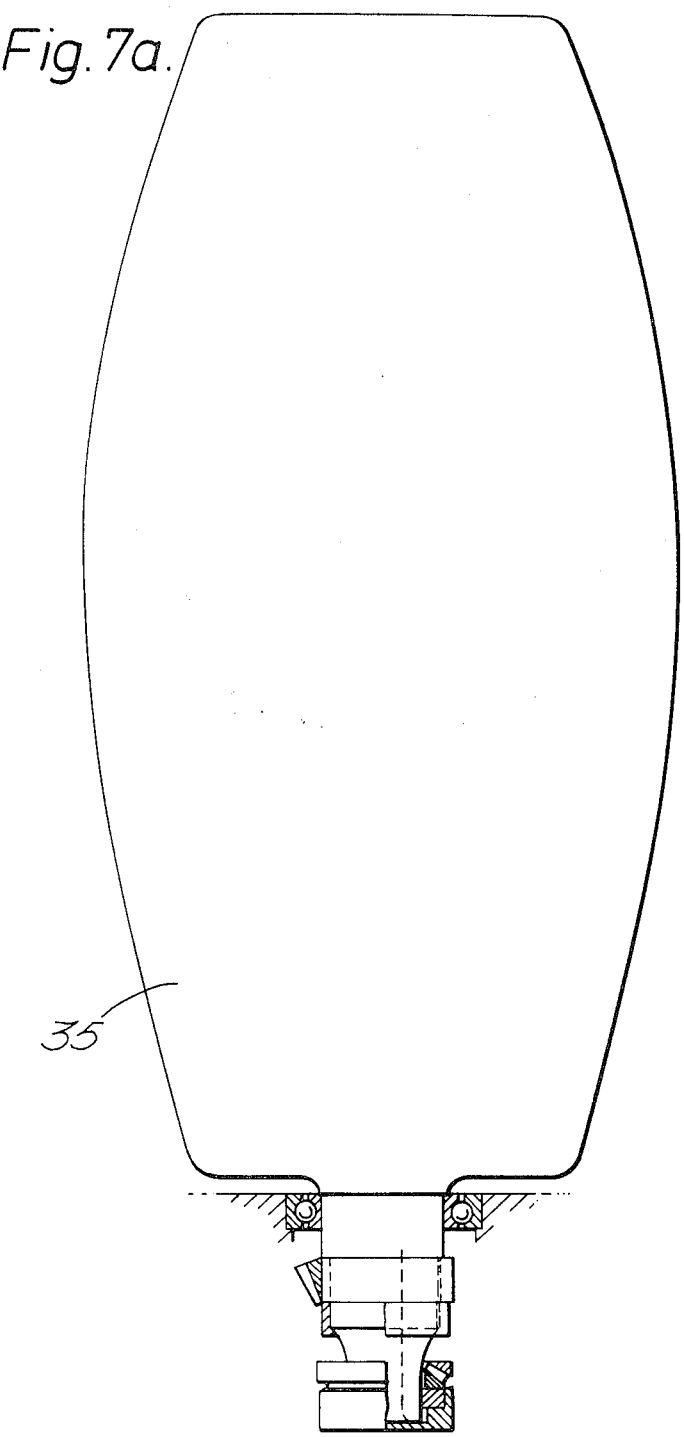
FIG. 7 shows details of typical propeller fan and stator blades.

Referring to FIGS. 6 and 7, there is illustrated in greater detail one specific embodiment of propulsion means 20 of this invention. The propulsion means 20 comprises three mechanical modules, namely a propeller fan module 21, a stator module 22 and a gearbox module 23. These are connected by three spools 25' which may be stainless steel, 25" and 25''' and extend outwardly from a cowl 36.

The propeller fan module 21 consists of a rotatable forged steel channel 26 in which are mounted fourteen equispaced propeller fan blades 27, each by means of a bayonet fitting 27', although other forms of fitting may be employed. Positioned within this channel, and concentric with a propeller fan quill 28, is a pitch change mechanism 29. This consists essentially of an annular hydromechanical actuator 30 which operates the propeller fan blade pitch control bevel gears 31 through a common drive gear 32 which can be an integral part of the actuator 30. A synchro gearbox 33 engages the drive gear 32 monitoring the blade angle and passing control data to the control system for the propulsion means.

The stator module 22 comprises a fixed steel channel 34 into which are mounted fourteen equispaced stator blades 35. A pitch change mechanism 36, having similar components to, and operating in a similar manner as, the pitch change mechanism 29 for the propeller fan module 21, is provided to vary the pitch of the stator blades 35; similar components are given like reference numerals. As an alternative, the propeller blades may have a pitch change mechanism which allows continuous variation of the pitch of the blades whilst the stator has a simplified mechanism which allows discrete variation of the pitch between, say, four positions.

The gearbox module 23 is a single stage epicyclic of generally conventional design and having a ratio of approximately 7:1. It is proposed that the oil employed as lubricant in the gearbox be cooled by passing it through passages formed in the stator blades 35.

Typical details of the above propulsion means are as follows:

| | |
|---|---|
| Cruise thrust, 4,800 lb at M = 0.75, | 30,000 feet |
| Diameter of propeller fan and stator | 10 feet |
| Nominal hub diameter | 2.8 feet |
| Axial spacing between centres of propeller fan and stator | 3.5 feet. |

There now follows a discussion of the criteria considered in the design of an embodiment of propulsion means having the first-described characteristics and it is emphasized that the numerical values and criteria quoted may be specific to this embodiment and that other values and criteria may be applied without departing from the invention.

In terms of aerodynamic design, the propulsion means of the present invention lies somewhere between the above-mentioned hybrid propeller fan of FIG. 4 and the low pressure ratio turbofan in terms of disc loading, so that in considering the design of a propeller fan and stator a mixture of airscrew and ducted fan technology has been used. Vortex airscrew theory (with 'tip corrections' for a finite number of blades) was adapted to allow for the presence of the stator. Blade section design has been considered in the light of cascade theory with a background of (isolated wing) high speed section design methods.

With the chosen cruise design point the advance ratio of a propeller is inevitably high leading to large blade angles and low efficiency for sections near the blade roots. Advance ratio could be reduced by raising tip speed, but this leads to higher noise and increased compressibility losses at the blade tips. It was therefore decided to restrict the (helical) tip Mach number of the propeller fan of the present invention to unity; with some blade sweep the compressibility losses and noise can then be kept to acceptable levels. In the described embodiment the propeller fan has a tip speed of 673 fps.

Given these design conditions and the chosen propeller fan diameter a high solidity—that is to say the ratio of the total blade area to the area swept by the blades of the propeller fan—is inevitable, and in the event an overall solidity of about 1.1 for both propeller fan and stator was used. Blade aspect ratio is low by conventional propeller standards, though not by turbofan standards. It was decided to use as little sweep as possible on the blades so as to minimise structural difficulties; however, with a high tip Mach number on the propeller fan, it was desirable to introduce sweep towards the tip. In consequence the blade chord on the propeller fan, which is high at mid-blade where the loading is high, diminishes rapidly outboard as blade speed increases and the leading edge sweep is introduced. Blade speed is essentially constant for the stator, so that no sweep is used, and the distribution of chord broadly reflects the distribution of swirl from the propeller fan. (See FIG. 7).

The overall thrust grading is shown in FIG. 8. This is the sum of propeller fan and stator gradings, which are also shown. It may be seen that the propeller fan loading reaches a peak at about 4.2 feet radius, while stator loading is more symmetrical with a maximum at about 3.2 feet. The swirl angle generated by the propeller fan (FIG. 9) is broadly related to the stator thrust grading. The overall grading was chosen so as to give reasonable efficiency while avoiding overload of the blade tips.

Mean (nominal) blade Mach numbers for propeller fan and stator are shown in FIG. 10. Towards the tip of the propeller fan the mean Mach number becomes high by propeller standards, though the component normal to the mid-chord line is reduced by the sweep (see FIG. 11).

Torque grading for the propeller fan is shown in FIG. 12. (Since in this (cruise) design case complete swirl removal has been assumed this is also the torque grading for the stator). Peak torque occurs at about 3.7 feet radius, inboard of peak propeller fan thrust and fairly close to peak overall thrust. Also shown in FIG. 12 is the variation of local propulsive efficiency. Efficiency is generally high except close to the blade root. These efficiencies are based on a design sectional blade $C_D$ of 0.01 (mid blade) for both propeller fan and stator.

Figure 13:
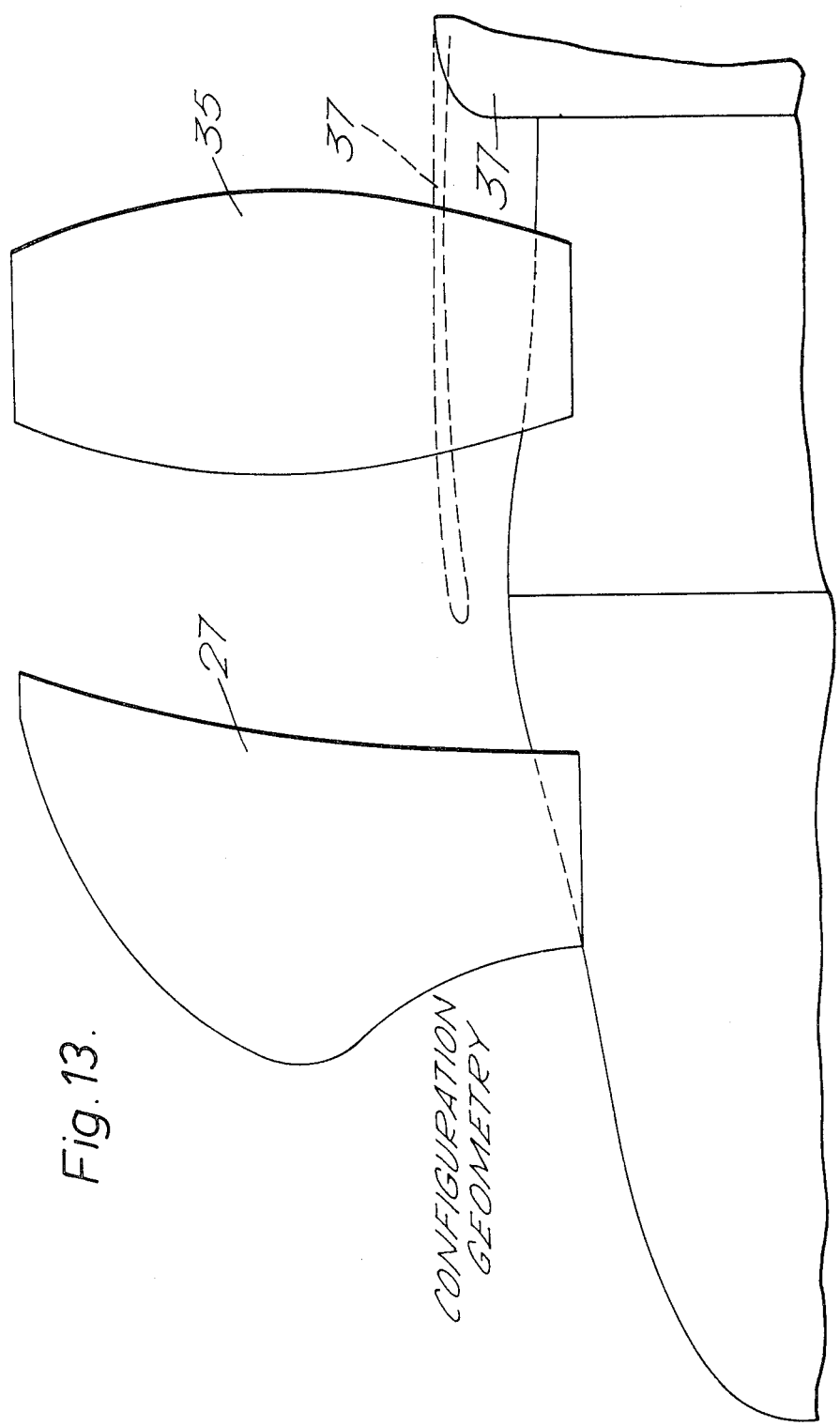
FIG. 13 shows a typical configuration geometry of the propulsion means.

Since there is likely to be a blade root choking problem it is advantageous to design the centre body to produce regions of lowered velocity in the region of the blade roots. In the described embodiment there is a need to provide reduced velocity regions for both rotor and stator blade roots; further in British practice the intake is annular with the gearbox mounted centrally in front of the engine, so that the intake air passes around the gearbox. If we follow British practice in this respect then a suitable centre body might be somewhat as indicated in full lines of FIG. 13—'contoured body.' The overall increase in centre body radius (from nominal) is quite small, allowing use of an annular intake. Various alternative configurations exist in one of which the cowl 37 extends further towards the propeller blades 27, and the stator blades extend through the cowl to the stator module 22, as shown in broken lines in FIG. 13.

Use of a contoured centre body would involve minor changes to the propeller fan designed as shown; in addition the effective stator diameter might be a little greater than that of the rotor.

It may be observed that with the large propeller fan solidity used it will not be possible to obtain reverse thrust by changing blade pitch through 'fine'. It will therefore be necessary to move the blades into reverse through 'feather', and suitable techniques to allow this will be required. The propeller fan blade sections will then be reversed as regards thickness distribution, but not as regards the sense of the camber. The stator blades will be similarly affected; they could be angled so as to reduce the degree of separation at the rotor blade 'leading' edges.

In conclusion, the above described embodiment of propulsion means offers the following advantages, by virtue of the relatively small diameter propeller fan. It may be mounted below a wing on a pylon in a similar manner as existing turbofan arrangements, and arranged so that there is minimum disturbance to the upper surface of the wing by the slipstream. Similarly, slipstream scrubbing drag may be reduced. Since the propeller fan is smaller the propulsion means may be positioned further from the cabin wall, thus reducing cabin noise; alternatively, the fin size required may be reduced by positioning the propulsion means closer to the aircraft centre line, thus reducing the engine out moment. The propulsion means has relatively high blade passing frequency and thus cabin vibration may be reduced, thus leading to more effective soundproofing. Since the propulsion means may be mounted below the wing, the nacelle/wing interference may be reduced. Similarly any interference with high lift devices on the wing may be reduced. If it is wished to mount the propulsion means on the rear fuselage of an aircraft, the stub weight and drag will be relatively small; in addition the propulsion means may be mounted on the fin of an aircraft.

In addition, the presence of the stator allows the swirl present in the flow into the gas generator flow to be reduced.

I claim:

1. An aircraft adapted to cruise at high subsonic speeds including propulsion means mounted thereon, said propulsion means including a propeller fan having at least 10 blades wherein the ratio of the total blade area to the area swept by the blades is at least 0.8 and which operates in the cruise condition at disc loading of at least 30 lb/ft² and consequently imparts to its slipstream a component of swirl of at least 10° in a given sense, and a multibladed stator arranged with respect to said propeller fan to impart a considerable component of swirl in the opposite sense so that the total swirl imparted to the slipstream is nil or relatively low, whereby the diameter of the propeller fan may be relatively low whilst maintaining a relatively high propulsive efficiency and thrust.

2. An aircraft adapted to cruise at high subsonic speeds including propulsion means mounted thereon, said propulsion means including a multibladed unshrouded propeller fan of relatively small diameter wherein the ratio of the area swept by the blades is relatively high and which in use operates in the cruise condition at such high disc loadings that it imparts to the slipstream a component of swirl of at least 10° in a given sense and a multibladed stator of similar diameter to the propeller fan disposed adjacent the propeller fan and including a sufficient number of blades to impart a considerable component of swirl in the opposite sense so that the total swirl imparted to the slipstream is nil or relatively low, whereby the proposal means may be mounted relatively close to a surface of the aircraft without causing significant interferences.

3. An aircraft propulsion means according to claim 2 or claim 1, wherein the propeller fan includes from 10 to 15 blades.

4. An aircraft propulsion means according to claim 2 or claim 1, wherein said stator includes 10 to 15 blades.

5. An aircraft propulsion means according to claim 2 or claim 1, wherein the swirl angle generated by the propeller fan lies in the range of from 10° to 25°.

6. An aircraft propulsion means according to claim 2 or claim 1, wherein the pitch of the blades of the propeller fan may be varied.

7. An aircraft propulsion means according to claim 2 or claim 1, wherein the pitch of the blades of the stator may be varied.

8. An aircraft as claimed in claim 2 or claim 1, propulsion means are mounted generally below a wing portion of the aircraft, wherein the diameter of the propeller fan is such that substantially all the slipstream passes below the wing, but that sufficient ground clearance is maintained to allow take-off and landing maneuvers.

9. An aircraft as claimed in claim 2 or claim 1, wherein the propeller fan includes a center body portion from which the blades extend, the body portion being shaped so that the velocity of the air flow through the propeller fan adjacent the body portion is reduced.

* * * * *